(12) United States Patent
Giampietro

(10) Patent No.: US 6,258,392 B1
(45) Date of Patent: Jul. 10, 2001

(54) MICROWAVEABLE PASTA PIE AND PAN ASSEMBLY

(76) Inventor: Celsi Giampietro, Via Bertarina, 55, Forli (IT)

( * ) Notice: Subject to any disclaimer, the term of this patent is extended or adjusted under 35 U.S.C. 154(b) by 0 days.

(21) Appl. No.: 09/412,669

(22) Filed: Oct. 5, 1999

(51) Int. Cl.[7] .............................. A23L 1/025; B65D 85/22
(52) U.S. Cl. .............................. 426/90; 426/94; 426/107; 426/143; 426/283
(58) Field of Search .............................. 426/90, 94, 283, 426/107, 128, 113, 557, 138, 143, 514

(56) References Cited

U.S. PATENT DOCUMENTS

| | | |
|---|---|---|
| D. 111,971 * | 11/1938 | Huse .................................... D1/101 |
| D. 277,044 * | 1/1985 | Kuhlman ............................... D1/130 |
| D. 303,312 * | 9/1989 | Vitacco ................................. D1/108 |
| D. 321,270 * | 11/1991 | Meyers, Jr. et al. .................... D1/106 |
| D. 376,465 * | 12/1996 | Haro et al. ............................ D1/114 |
| D. 407,535 * | 4/1999 | Hursh .................................... D1/130 |
| 1,518,587 | 12/1924 | Laskey . |
| 1,556,617 | 10/1925 | Laskey . |
| 1,736,611 | 11/1929 | Lubrano . |
| 1,874,503 | 6/1932 | Greenwood . |
| 1,942,423 * | 1/1934 | Henry .................................... 426/94 |
| 1,946,238 | 2/1934 | Ronzoni . |
| 1,959,006 | 5/1934 | Penza . |
| 2,386,993 * | 10/1945 | Valdastri, Sr. ........................ 426/283 |
| 2,619,049 | 11/1952 | Viviano . |
| 2,858,219 | 10/1958 | Benson . |
| 2,950,200 * | 8/1960 | Jones et al. ............................ 426/91 |
| 3,402,682 | 9/1968 | Peden et al. . |
| 3,412,694 | 11/1968 | Hewett et al. . |
| 3,847,531 | 11/1974 | McComb . |
| 4,373,895 | 2/1983 | Yamamoto et al. . |
| 4,381,912 | 5/1983 | Yamamoto et al. . |
| 4,384,841 | 5/1983 | Yamamoto et al. . |
| 4,384,842 | 5/1983 | Cavalli . |
| 4,550,006 | 10/1985 | Kato . |
| 4,722,819 | 2/1988 | Lundsager . |
| 4,732,770 * | 3/1988 | Welygan et al. ........................ 426/94 |
| 4,937,089 | 6/1990 | Ikoma et al. . |
| 5,089,203 | 2/1992 | Kragle . |
| 5,286,323 | 2/1994 | Bagley . |
| 5,552,102 | 9/1996 | Kragle et al. . |
| 5,614,237 * | 3/1997 | Clow et al. ............................ 426/144 |
| 5,643,618 | 7/1997 | Huberg . |
| 5,906,839 | 5/1999 | Miura et al. . |

* cited by examiner

*Primary Examiner*—Milton Cano
*Assistant Examiner*—Sherry A. Dauerman
(74) *Attorney, Agent, or Firm*—Alan Kamrath; Rider, Bennett, Egan & Arundel, LLP

(57) ABSTRACT

A microwavabel pasta pie (10) and pan (32) assembly, includes a shell (12) formed by grid-shaped walls (16) integrally formed within an outer wall (18) to thereby define a plurality of vertical, open through passages (14). The shell (12) is supported upon a pie plate (32) having a planar bottom (34) which closes the bottom face (20) of the shell (12) and of the passages (14). A filling (38) is located within and retained by the passages (14) and the pie plate (32), and a topping (40) such as powdered cheese is provided on the filling (38). The pasta pie (10) is frozen inside of a plastic bag (42). In the most preferred form, the pasta pie (10) is cooked in a microwave oven, with the pie plate (32) being disposable and utilized during microwave cooking as well as during serving and consumption.

21 Claims, 1 Drawing Sheet

MICROWAVEABLE PASTA PIE AND PAN ASSEMBLY

BACKGROUND

The present invention generally relates to a food product, relates specifically to a pasta product, more specifically to a microwaveable pasta product, and particularly to a pasta pie.

Pasta products are enjoyed by many consumers. In the past, pasta has been created by passing a pasta mix through a die so as to create an extruded shape of the pasta. Traditionally, pasta is formed as spaghetti, linguini, lasagna and various other elongated extruded shapes. Pasta is often cut so as to form shorter shapes.

Conventionally, pasta products were generally prepared in the kitchen by the cook separately preparing the pasta and the desired sauces and combining them prior to their being served. However, there is an increasing desire for convenience food products which minimizes the preparation time and effort for the preparer while still obtaining and even preferably exceeding the taste and character of made from scratch food products. Additionally, there is increasing pressure for reducing the cost of such food products, with such pressure coming from the existence of other types of food products as well as from the consumers themselves.

Although present in the marketplace, currently available prepared pasta products suffer from various deficiencies. Specifically, due to the elongated shape of many pasta products, the products such as lasagna are made in layers which are difficult and/or relatively expensive to mechanically fabricate. Similarly, many pasta products are filled or stuffed which can be manufactured by various processes while maintaining various degrees of consistencies and tolerance levels. However, a major deficiency in current prepared pasta products is their deficiencies in the ability to be microwaved in the final preparation for consumption. Specifically, because of their inability to maintain a shape, many pasta products, especially including short length pasta, are sealed in plastic bags which can be dropped in boiling water, with the pasta products being removed from the bags and placed on a serving utensil. Similarly, such pasta products are removed from the sealed plastic bags and placed on a microwaveable utensil for microwaving. For either case, such pasta products require the use of utensils beyond their own packaging, which detracts from their convenience. But more importantly, conventional pasta products suffer from various deficiencies in their ability to be cooked utilizing microwaves. Specifically, products which do not have or maintain a constant size and thickness often will tend to be overcooked at certain areas while being undercooked at other areas. Likewise, products which are formed in layers have a thickness resulting in the dramatic increase in the amount of time required for microwave cooking as well as inconsistencies in cooking in different areas or portions of the food products.

Thus, there exists a continuing need for pasta products which can easily be prepared by microwaving, can be served in the same pan in which it was microwaved, and having a flavor, appearance, and consistency which is favorable to most consumers of pasta products.

SUMMARY

The present invention solves this need and other problems in the field of microwaveable products by providing, in the preferred form, a honeycomb shell including grid-shaped walls integrally formed within an outer wall and defining a plurality of passages open from the top face to the bottom face. A filling is located within and retained by the passages and by a pan which abuts with the bottom face and closes the passages of the shell. In the most preferred form, the shell is formed of pasta and the filling is a sauce which is commonly served with pasta. The height of the passages allows microwave energy to reach all points of the filling retained in the passages.

It is thus an object of the present invention to provide a novel microwaveable food product in the form of a pie.

It is further an object of the present invention to provide such a novel microwaveable food product in the form of a pasta pie.

It is further an object of the present invention to provide such a novel microwaveable food product including a shell in a honeycomb shape.

It is further an object of the present invention to provide such a novel microwaveable food product including a honeycomb shaped shell including vertical passages which can be easily mechanically filled.

It is further an object of the present invention to provide such a novel microwaveable food product including a shell having a thickness which allows microwave energy to reach all points of the filling retained in the shell.

It is further an object of the present invention to provide such a novel microwaveable food product retaining a microwaveable filling at a constant thickness.

It is further an object of the present invention to provide such a novel microwaveable food product requiring minimal cleaning of utensils and cooking areas.

It is further an object of the present invention to provide such a novel microwaveable food product minimizing the amount of time required for microwave cooking while maximizing uniformity in cooking.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
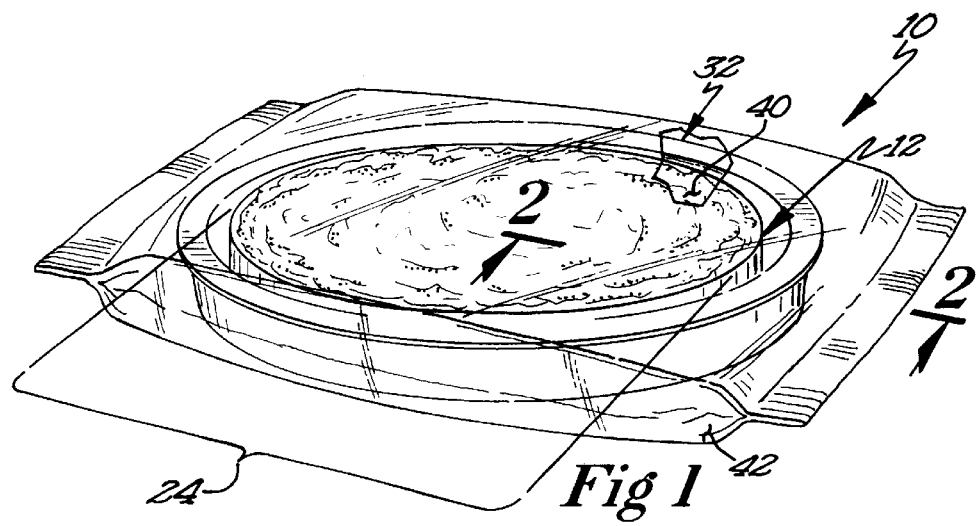
FIG. 1 shows a perspective view of a microwaveable pasta pie according to the preferred teachings of the present invention.
Figure 2:
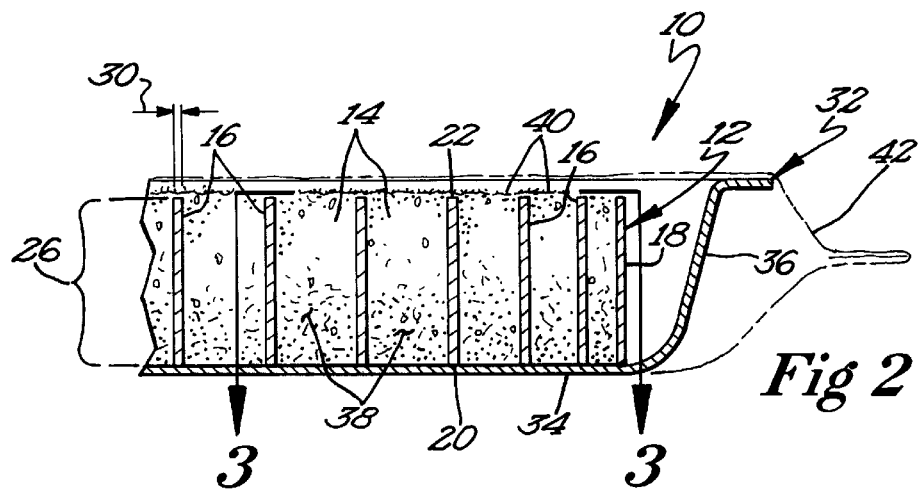
FIG. 2 shows a partial cross sectional view of the microwaveable pasta pie of FIG. 1 according to section line 2—2 of FIG. 1.
Figure 3:
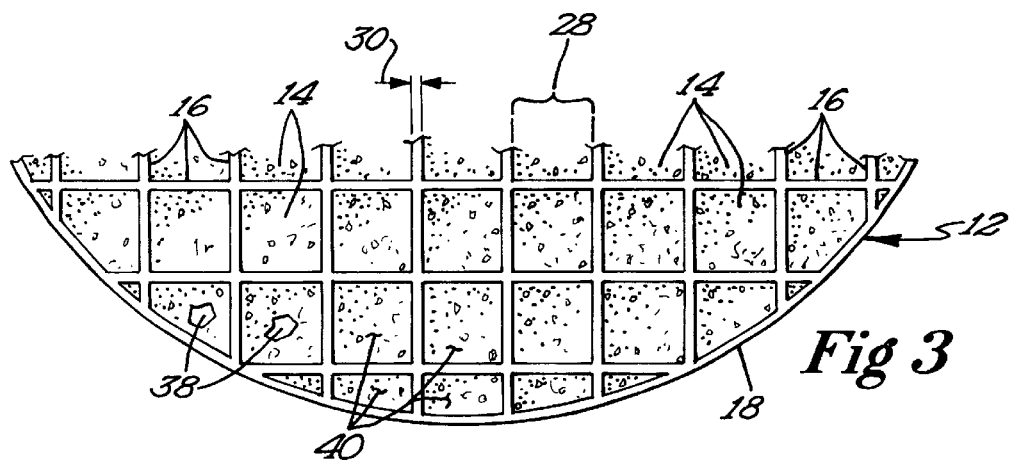
FIG. 3 shows a cross sectional view of the microwaveable pasta pie of FIG. 1 according to section line 3—3 of FIG. 2.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the term "top", "bottom", "first", "second", "face", "outer", "height", "width", "length", "size", "thickness", "horizontal", "vertical", and similar terms are used herein, it should be understood that these terms have reference only to the structure shown in the drawings as it would appear to a person viewing the drawings and are utilized only to facilitate describing the illustrative embodiment.

Description

A pasta pie according to the preferred teachings of the present invention is shown in the drawings and generally designated 10. Generally, pie 10 includes a pasta shell 12 formed in a honeycomb structure in the most preferred form of the present invention by extrusion. Specifically, sheet 12 is provided with a large number of open passages 14 which are separated by grid-shaped walls 16 and an outer wall 18. Shell 12 includes spaced, parallel bottom and top faces 20 and 22 which extend generally perpendicularly to walls 16 and outer wall 18. In the preferred form, outer wall 18 is circular in cross section and has a size 24 between 8 to 14 centimeters and in the most preferred form has a diameter of between 13 to 14 centimeters. The height 26 of shell 12 between faces 20 and 22 is a multiple times less than the diameter 24 of outer wall 18 and particularly has height 26 such that microwave energy is able to pass through faces 20 and 22 and reach all points in the interior of shell 12 of pie 10. Specifically, height 26 of shell 12 is between 1.25 and 3.8 centimeters and in the most preferred form is between 1.25 and 2.5 centimeters. With shell 12 formed in the preferred form by extrusion, passages 14 have a constant size between faces 20 and 22 and are open through the entire height 26 of shell 12 including at faces 20 and 22. In the preferred form, passages 14 spaced from outer wall 18 are square in cross section and have a size 28 less than height 26, and in the most preferred form, walls 18 have a length of approximately 1 centimeter. In the preferred form, walls 16 and 18 have a thickness 30 which are considerably smaller than size 28 and than height 26 and in the most preferred form, have equal thicknesses in the order of 2 millimeters.

In the most preferred form, shell 12 is formed of cooked pasta dough prepared from a farinaceous ingredient and water, with or without one or more additives. The farinaceous ingredient may be one or more of durum semolina, rice flour, buckwheat flour, durum flour, regular wheat flour, whole wheat flour, farina flour, corn flour, or any mixture thereof. In the most preferred form, shell 12 is extruded in the desired shape and cooked in high temperature water to obtain the desired moisture content.

As passages 14 are open at bottom face 20, pasta pie 10 includes a flat bottom bowl or pie pan 32 in the most preferred form formed of microwaveable material and specifically which allows microwaves to generally pass therethrough without absorption such as but not limited to from paper stock. In particular pan 32 includes a flat, planar bottom 34 of a size generally equal to but preferably slightly larger for production tolerances and a rim 36 extending from the periphery of bottom 34 to a height corresponding to and preferably slightly higher than height 26. In the preferred form, bottom 34 has a periphery of a shape corresponding to the cross sectional shape of outer wall 18 and shell 12 and in the most preferred form of a circular shape.

Pie 10 further includes a filling 38 located in shell 12 which in the preferred form can be any conventional cooked pasta filling including but not limited to a cheese filling, a meat or seafood filling, a vegetable filling, a tomato based filling, or the like. In the preferred form, filling 38 is of an amount sufficient and in the most preferred form slightly in excess to generally fill each passage 14 in shell 12, but generally so as not to overflow outer wall 18. Furthermore, after microwave cooking, filling 38 should still fill or slightly overfill passages 14 in shell 12 to result in a very favorable appearance to the consumer. It should be appreciated that filling 38 could be homogeneous throughout the entire area of shell 12 or could be in any desired pattern. As an example, the lower portions of each passage 14 could be filled with one type such as a cheese filling while the upper portions of each passage 14 could be filled with another type such as a meat filling. Likewise, certain areas such as a semicircular shaped portion could be filled with one type of filling such as a vegetable filling while other portions could be filled with one or more other type of filling such as a tomato based filling.

In the most preferred form, pie 10 further includes a topping 40 located on filling 38 and within outer wall 18. Topping 40 could include one or more of the following: a powdered or ground cheese, a cheese slice, olive slices, shrimp, or like food item as well as aesthetically pleasing garnish such as parsley or basil leaves.

In the preferred form, pasta pie 10 is sealed in a plastic bag 42 which in the most preferred form is clear. Pie 10 sealed in bag 42 can then be placed in an individual package, and multiple packages can be placed in cartons. Pie 10 can be sold in individual packages, in a plurality of packages, or in cartons, as desired.

When it is desired to consume pasta pie 10, pasta pie 10 is removed from the packaging. After removal from plastic bag 42, pasta pie 10 can be placed directly within the microwave oven for cooking and specifically without requiring the addition of other elements, mixing, or the like. It can then be appreciated that pasta pie 10 achieves advantages in its ability to be cooked in a microwave. Specifically, pasta pie 10 has a relatively constant thickness throughout its entire cross sectional area. Particularly, shell 12 and thus passages 14 and filling 38 filled within passages 14 have a constant height 26 within outer wall 18. Therefore, as pasta pie 10 according to the teachings of the present invention has a constant thickness, uniform cooking can be achieved without overcooking or undercooking portions. In this regard, it should be appreciated that this is one of the reasons that it is desired that overflow of filling 38 and topping 40 over outer wall 18 should be minimized, as such overflow would have a thickness less than height 26 and be subject to overcooking. Likewise, height 26 is within a range such that all points within pasta pie 10 according to the teachings of the present invention are directly subject to microwaves and specifically height 26 is not sufficient that microwave energy is prevented from reaching the interior of pasta pie 10. Similarly, the circular shape of outer wall 18, of shell 12, and pasta pie 10 of the most preferred form of the present invention is also believed advantageous in the elimination of corners as corners which would be present in other shapes such as squares have a tendency to absorb a greater amount of microwave cooking resulting in overcooking.

It should then be appreciated that microwave cooking occurs utilizing pie plate 32 in which pasta pie 10 is formed and packaged. Thus, it is not necessary to place pasta pie 10 on a separate microwaveable container for microwave cooking according to the teachings of the present invention. Similarly, pasta pie 10 can be served to the consumer and consumed from pie plate 32 according to the preferred teachings of the present invention, with pasta pie 10 in the most preferred form being a single serving providing a complete balanced meal. As pie plate 32 in the most preferred form is formed of disposable material such as paper stock, minimal cleaning of utensils and cooking areas is required according to the preferred teachings of the present invention.

Furthermore, shell 12 of pasta pie 10 according to the teachings of the present invention is particularly advantageous. Specifically, the relatively large cross sectional area of shell 12 allows shell 12 to have a relatively small height 26. In addition to the advantages in its ability to microwave cook previously set forth, the small height 26 lends itself to mechanical fabrication and handling. Likewise, the vertical orientation of passages 14 and their relatively short height allows filling 38 to be filled therein by simply dispersing filling 38 on top face 22 for flowing under gravitational forces into passages 14, with it being possible to enhance downward movement of filling 38 into passages 14 by placing a rotating downward force on filling 38 after its dispensing on shell 12. Thus, the problems of layering or mixing the pasta with the sauces, of filling or stuffing filling in pasta, and the like are avoided utilizing shell 12 according to the teachings of the present invention. Likewise, the vertical orientation allows filling 38 to be retained within the confines of outer wall 18 during fabrication and cooking and specifically filling 38 does not have a tendency to flow from passages 14 as would occur if they were horizontally orientated. Retention of filling 38 in a constant thickness is important in uniformity of microwave cooking.

Now that the basic teachings of the present invention have been explained, many extensions and variations will be obvious to one having ordinary skill in the art. For example, although the present invention has been explained with shell 12 having a circular outer wall 18 which is believed to produce synergistic results, shell 12 according to the teachings of the present invention could be formed in other shapes including novelty shapes such as in the form of heads or people, regular or irregular shapes such as in the form of squares, stars, half circles, quarter circles, rectangles or hexagons, without outer wall 18 or portions thereof, and the like. Similarly, passages 14 can have shapes other than square as in the preferred form shown of the present invention including but not limited to circular, oval, or the like.

Likewise, although shown and described as pasta pie 10 being frozen and including filling 38 within passages 14 in the most preferred form for maximizing long-term storage and protection of shell 12, pasta pie 10 could be commercialized in other forms according to the teachings of the present invention. As an example, filling 38 and/or topping 40 could be produced separately from shell 12 for addition by the cook and/or consumer. Likewise, pasta pie 10 could be provided preserved by other means including but not limited to refrigeration and can be provided for final cooking by other means including but not limited to toaster ovens and conventional ovens. Further, although shown and described with pie 10 being in the form of a pasta food product which is served hot, pie 10 according to the teachings of the present invention could be utilized for other types of food products of the pasta type or not of the pasta type, including but not limited to a pasta salad, a pasta soup, a pasta casserole, a pasta pizza, a pasta calzone, a lasagna nouvelle, or the like.

Furthermore, although described as being formed by extrusion in the most preferred form and which is believed to be advantageous at least for ease of fabrication, shell 12 could be formed by other methods according to the teachings of the present invention such as but not limited to by a pressing or molding process. Such a process may allow pie plate 32 to be formed of edible material and preferably of the same materials and integral with shell 12. Thus, pie 10 could be mechanized to be consumed in its entirety aside from plastic bag 42 and any further packaging or with a further container for fabrication, packaging, cooking, and/or serving purposes.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A microwaveable pie and pan assembly comprising, in combination:

an edible shell including an outer wall and integral grid-shaped walls within the outer wall defining a plurality of passages, with the shell having an open top face and an open bottom face, with the plurality of passages being open from the top face to the bottom face and at the top and bottom faces;

a pan including a planar bottom of a size at least equal to the outer wall and for abutting with the bottom face for closing the plurality of passages at the bottom face; and an edible filling located within and retained by the passages and the pan.

2. The microwaveable pie and pan assembly of claim 1 wherein the shell is formed of pasta.

3. The microwaveable pie and pan assembly of claim 2 wherein the pan further includes a rim extending from the planar bottom to an extent at least equal to the top face of the shell.

4. The microwaveable pie and pan assembly of claim 3 further comprising, in combination: a plastic bag in which the pan, shell, and filling are sealed.

5. The microwaveable pie and pan assembly of claim 4 further comprising, in combination: a topping upon the filling located within and retained by the passages and the pan.

6. The microwaveable pie and pan assembly of claim 2 wherein the shell is formed by extrusion.

7. The microwaveable pie and pan assembly of claim 6 wherein the passages have a constant size between the top and bottom faces.

8. The microwaveable pie and pan assembly of claim 7 wherein the passages have a height allowing microwave energy to reach all points of the filling in the passages.

9. The microwaveable pie and pan assembly of claim 8 wherein the passages spaced from the outer wall are square in cross section.

10. The microwaveable pie and pan assembly of claim 9 wherein the outer wall has circular cross sections.

11. The microwaveable pie and pan assembly of claim 10 wherein the grid-shaped walls have a thickness generally equal to the thickness of the outer wall.

12. The microwaveable pie and pan assembly of claim 10 wherein the outer wall has a size of between 8 to 14 centimeters.

13. The microwaveable pie and pan assembly of claim 2 wherein the shell has a height between the top and bottom faces which is a multiple times less than the size of the cross section of the outer wall.

14. The microwaveable pie and pan assembly of claim 13 wherein the height of the shell is between 1.25 and 3.8 centimeters.

15. The microwaveable pie and pan assembly of claim 13 wherein the passages each have a upright length less than the height of the shell.

16. The microwaveable pie and pan assembly of claim 15 wherein the upright length of the passages are approximately 1 centimeter.

17. The microwaveable pie and pan assembly of claim 16 wherein the grid-shaped walls have a thickness considerably smaller than the length of the passages.

18. The microwaveable pie and pan assembly of claim 17 wherein the thickness of the grid-shaped walls is in the order of 2 millimeters.

19. The microwaveable pie and pan assembly of claim 2 wherein the filling includes one or more of a cheese filling, a meat or seafood filling, a vegetable filling and a tomato based filling.

20. The microwaveable pie and pan assembly of claim 1 wherein the passages have a height allowing microwave energy to reach all points of the filling in the passages.

21. The microwaveable pie and pan assembly of claim 1 wherein the pan is formed from disposable, microwaveable material separate from the shell.

* * * * *